(12) United States Patent
Hildman

(10) Patent No.: US 6,237,277 B1
(45) Date of Patent: May 29, 2001

(54) FISHING APPARATUS

(76) Inventor: James C. Hildman, P.O. Box 1412, Minden, NV (US) 89423

( * ) Notice: Subject to any disclaimer, the term of this patent is extended or adjusted under 35 U.S.C. 154(b) by 0 days.

(21) Appl. No.: 09/303,093

(22) Filed: Apr. 29, 1999

(51) Int. Cl.[7] ............................................ A01K 8/03
(52) U.S. Cl. ............................................ 43/43.16
(58) Field of Search ............................... 43/43.16

(56) References Cited

U.S. PATENT DOCUMENTS

| D. 276,360 | * | 11/1984 | Sitton | 43/43.16 X |
| 3,854,235 | * | 12/1974 | Thompson | 43/43.12 |
| 4,337,591 | * | 7/1982 | Gell et al. | 43/42.09 |
| 4,603,502 | * | 8/1986 | MacDonald | 43/41 |
| 4,731,948 | * | 3/1988 | Helton | 43/42.33 |
| 4,862,633 | * | 9/1989 | Hague et al. | 43/44.84 |
| 4,987,697 | * | 1/1991 | Klein | 43/44.83 |
| 5,005,311 | * | 4/1991 | Dawson et al. | 43/42.32 |
| 5,170,580 | * | 12/1992 | Rosenblatt | 43/42.06 |
| 5,185,951 | * | 2/1993 | Hemmerle | 43/43.13 |
| 5,377,443 | * | 1/1995 | Giray et al. | 43/44.9 |
| 5,388,366 | * | 2/1995 | Kretschmer | 43/43.16 |
| 5,600,916 | * | 2/1997 | Smith | 43/42.47 |
| 5,608,986 | * | 3/1997 | Spurgeon et al. | 43/43.13 |

FOREIGN PATENT DOCUMENTS

| 2483175 | * | 12/1981 | (FR) . |
| 2520973 | * | 8/1983 | (FR) . |
| 2134361 | * | 8/1984 | (GB) . |
| 2285730 | * | 7/1995 | (GB) . |
| 02128635 | * | 5/1990 | (JP) . |
| 06000045 | * | 1/1994 | (JP) . |
| 0121719 | * | 5/1997 | (JP) . |
| 09289844 | * | 11/1997 | (JP) . |

* cited by examiner

*Primary Examiner*—Peter M. Poon
*Assistant Examiner*—Jeffrey L. Gellner

(57) ABSTRACT

This invention relates to the use of polymeric-based materials to make fish hooks for producing clear, translucent, or colored fish hook devices. Additionally, this invention provides for a medium to place scented materials for the purpose of attracting prey.

7 Claims, 4 Drawing Sheets

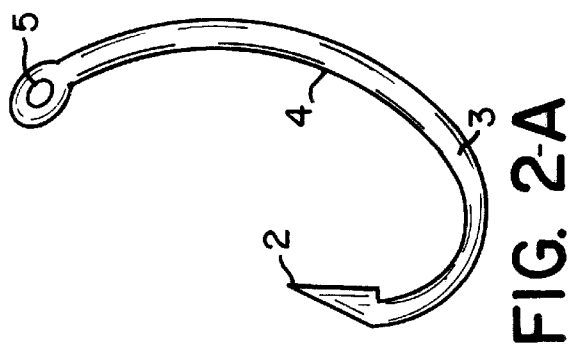
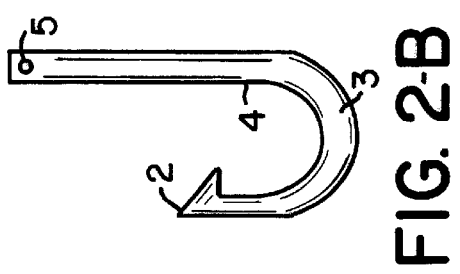
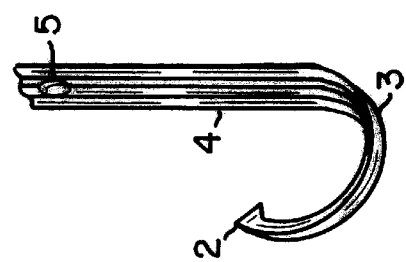
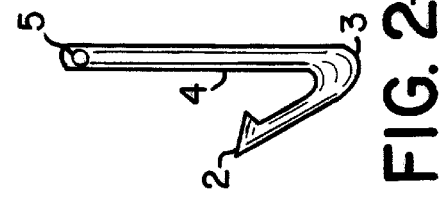

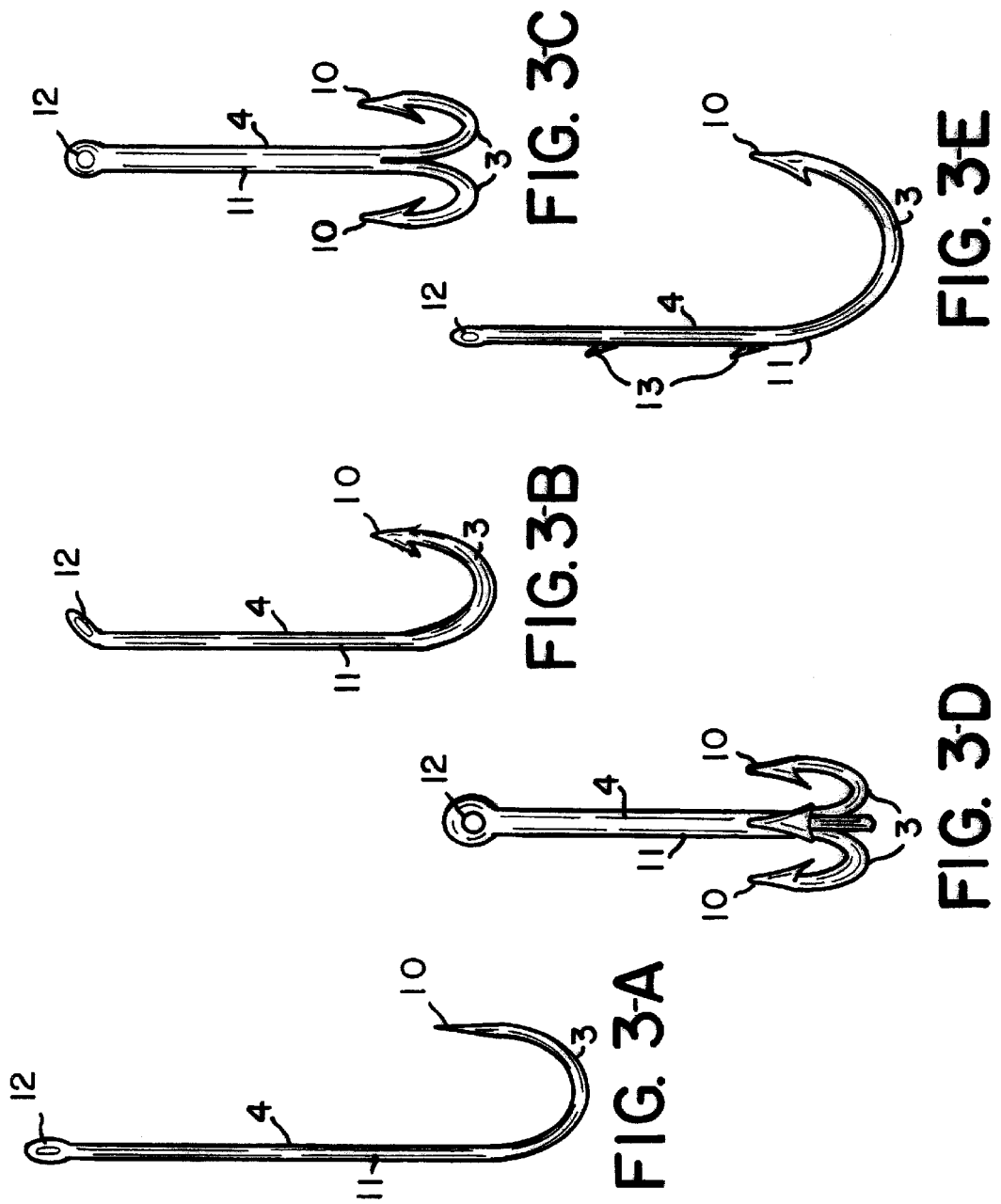

FISHING APPARATUS

BACKGROUND OF THE INVENTION

1. Field of the Invention

This invention relates to the composition of a underwater gear; more particularly, this invention relates to the clear, translucent, or colored underwater fishing gear; and most particularly, this invention relates to the use of polymeric-based materials to make fish hooks.

2. State of the Art

The use of fishing devices is known in the prior art. More specifically, metal fishing devices devised and utilized for the purpose of hooking fish are know to consist basically of familiar, expected, and obvious structural configurations, notwithstanding the myriad of designs encompassed by the crowded prior art which has been developed for the fulfillment of countless objectives and requirements.

However, the metal fishing hooks can sometimes be disadvantageous due to their color, appearance, and/or scent. The visual properties of a fish hook device relates to the appearance of the material in water. The enhancement in visual properties is achieved by either reducing the prey's ability to visually perceive the hook, or by the visual appearance of the hook serving to attract the prey in comparison to the appearance displayed by a hook made of a metallic material.

The scent properties of a fish hook device relates to the taste and/or 5 smell of the material to the prey in water. The enhancement in scent properties is achieved by either reducing the scent of the material in comparison to that of a metallic material so that prey are less likely to be wary of the material, and/or enhancing the scent of the material so that prey are attracted to the material.

Therefore, it can be appreciated that there exists a continuing need for a fish hook device that can be used to decrease the disadvantages of a metal fish hook. Accordingly, it is an object of this invention to overcome the aforementioned disadvantages of the metal fish hook.

It is still another object of this invention to use the polymeric fishing devices to provide a medium in which to place a scented material for the purposes of attracting prey.

It is still another object of this invention to surface treat the polymeric fishing devices to modify the scent and/or modify the visual properties of the material.

Additional objectives, advantages, and novel features of the invention will be set forth in the detailed description which follows, and in part will become apparent to those skilled in the art upon examination of the following, or may be learned by practice of the invention.

SUMMARY OF THE INVENTION

This invention relates to the use of polymeric-based materials to make fish hooks for producing clear, translucent, or colored fish hook devices. Additionally, this invention provides for a medium to place scented materials for the purpose of attracting prey.

An aspect of this invention is an underwater fishing component, comprising: a resilient material having an index of refraction substantially the same as that of water. It is preferred that the resilient material be selected from the group of materials consisting of:

polycarbonates

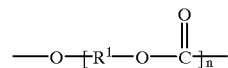

where R is alkylene and n is an integer having a value between 500 and 25,000;

Polyimides

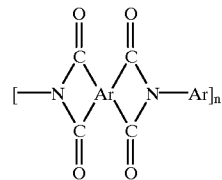

where Ar is aryl and n is an integer having a value between 500 and 25,000;

Polyesters

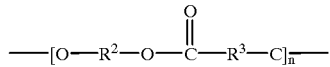

where R2 and R3 may be the same or different and are alkylene and n is an integer having a value between 500 and 25,000;

Polyurethane

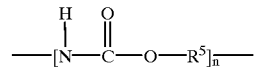

where R5 is alkylene and n is 500 to 25,000;

Polyacetals —[$CH_2$—O—$R^8$—O]$_n$— where R8 is alkylene and n is an integer having a value between about 500 and 25,000;

Polyamides

where R9 and R10 may be the same or different and are alkylene and R11 and R12 may be the same or different and are hydrogen or alkyl and n is an integer having a value between about 500 and 25,000;

Polyethers —[$R^{13}$—O—$R^{14}$]$_n$— where R13 and R14 may be the same or different and are alkylene and n is an integer having a value between 500 and 25,000;

Polystyrenes

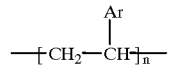

where Ar is aryl and n is an integer between about 500 and 25,000;

Polyacrylates

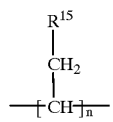

where R15 is alkyl or cyano (—CN) and n is an integer selected between about 500 and 25,000; and epoxies, polysufone, cyclic olefin copolymer, polyetherimide and nylon.

In an especially preferred embodiment this invention provides a fish hook comprising: a resilient material having an index of refraction substantially the same as that of water.

BRIEF DESCRIPTION OF THE DRAWING

FIGS. 2A–2E shows an alternative shape for the fish hook of this invention.

FIGS. 3A–3E shows an alternative shape for the fish hook of this invention.

DETAILED DESCRIPTION OF THE PREFERRED EMBODIMENT

Definitions

The following definitions are uses to exemplify the invention and not used in any way to limit the scope of the appended claims.

As used herein the word "alkyl" means hydrocarbon radicals having from one to six carbon atoms.

As used herein the word "aryl" means hydrocarbon radicals having an aromatic structure with between one and four alkyl radicals substituted thereon.

As used herein the word "alkylene" means an alkyl radical with at least two sites of substitution.

The Preferred Embodiment

This invention provides underwater fishing components that are substantially transparent under water. The components can be selected from fish hooks, swivels, weights, and connector hardware. This specification will focus on one particularly preferred embodiment, the transparent fish hook.

Figure 1:
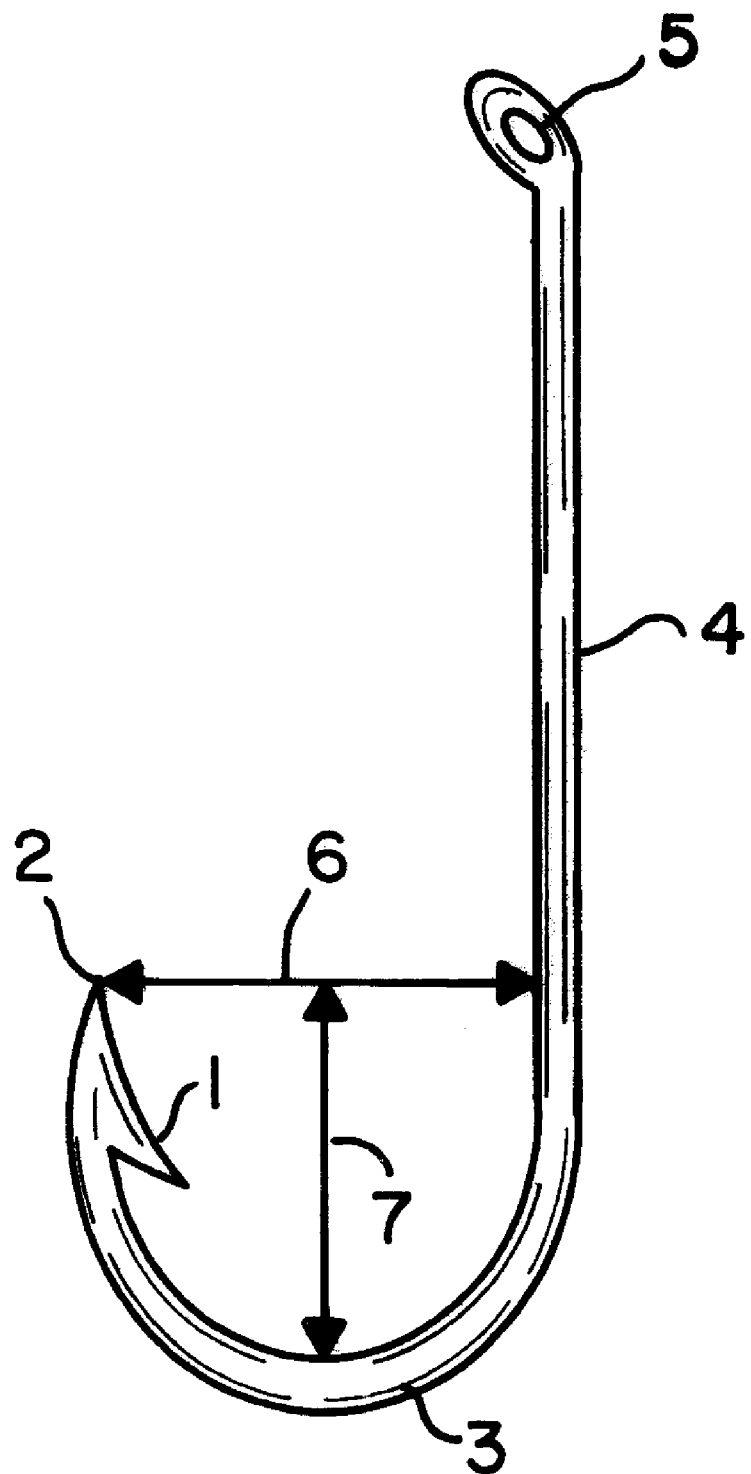
FIG. 1 shows a perspective view of a fish hook with all its parts.
Figure 4:
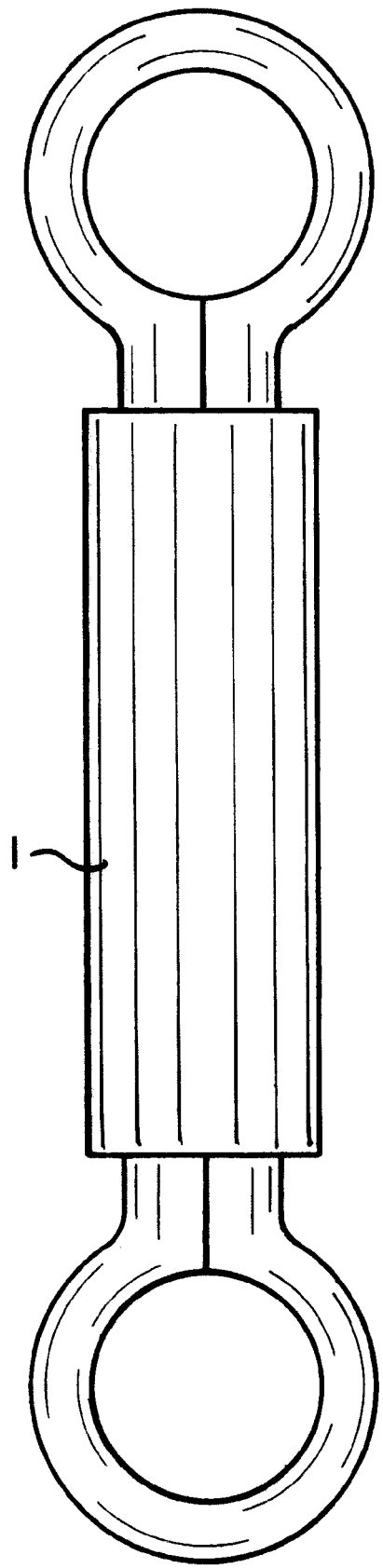

Referring to FIG. 1, a resilient material is used to make a fish hook device. The fish hook starts with the eye 5, which is connected to the shank 4. The shank then connects with the bend 3 and the fish hook device ends with a point 2 that has a barb 1. The resilient material has an index of refraction substantially the same as or greater than that of water. Moreover, the invention is intended to be used to obtain any prey, either fresh or salt water, which may include, but is not limited to fish, amphibians, reptiles, mammals, or crustaceans.

The resilient material is a polymeric compound, which is either currently available or can be synthesized, that will produce a resilient material which is either optically clear, translucent, or has a tinted color for the purposes of catching prey. In a preferred embodiment, the resilient material is: (1) a clear material which is not easily seen by the prey; (2) a material with an index of refraction close to that of water such that it is not easily seen by the prey; (3) a material which is translucent such that it is not easily seen by the prey, and/or (4) a material which is either clear or translucent but additionally possesses a tinted color in such a manner that it is not easily seen by the prey, or may serve to be attractive to the prey.

Although the invention consists of a product made from substantially the resilient material, the product may include other materials, for example, carbon steel, stainless steel, rustless alloys, and other similar materials. In one particularly preferred embodiment, the fish hook of the invention includes between about 5 wt % and 35 wt % of glass fibers.

In the preferred embodiment, the fish hook is made out of glass, glass fibers, laminated glass, tempered glass, natural quartz, fused quartz, or synthetic quartz. The glass or quartz may be used as an adjunct to the polymeric material, or it may be used as the primary material.

The materials used to make the invention may be selected for different parts of the fish hook, for example, the barb 1 may be the only portion of the fish hook made out of carbon steel with the resilient material and shank 4 are made from a rustless alloy whereas the remainder of the fish hook is made from the resilient material. Moreover, the resilient material may include glass fibers or the like as well as the metallic portions.

The above mentioned polymeric materials include, but are not limited to:

polycarbonates

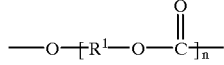

where R is alkylene and n is an integer having a value between 500 and 25,000;

Polyimides

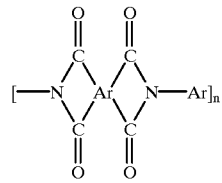

where Ar is aryl and n is an integer having a value between 500 and 25,000;

Polyesters

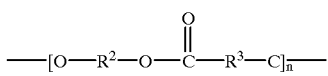

where R2 and R3 may be the same or different and are alkylene and n is an integer having a value between 500 and 25,000;

Polyurethanes

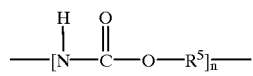

where R5 is alkylene and n is 500 to 25,000;

Polyacetals —[$CH_2$—O—$R^8$—O]$_n$— where R8 is alkylene and n is an integer having a value between about 500 and 25,000;

Polyamides

where R9 and R10 may be the same or different and are alkylene and R11 and R12 may be the same or different and are hydrogen or alkyl and n is an integer having a value between about 500 and 25,000;

Polyethers —$[R^{13}$—O—$R^{14}]_n$— where R13 and R14 may be the same or different and are alkylene and n is an integer having a value between 500 and 25,000;

Polystyrenes

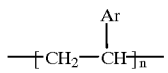

where Ar is aryl and n is an integer between about 500 and 25,000;

Polyacrylates

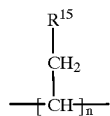

where R15 is alkyl or cyano (—CN) and n is an integer selected between about 500 and 25,000; and epoxies, polysufones, cyclic olefin copolymers, polyetherimide and nylon.

Other materials can be substituted if they are substantially transparent as seen underwater. Examples include glass, tempered glass, laminated glass, quartz, synthetic quartz and mixtures of quartz and glass.

These polymeric materials may be used as homopolymers, copolymers and/or blends of any of the above mentioned polymers. The morphology of the polymeric materials or mixtures may be linear, branched, hyperbranched, star formation, crosslinked, interpenetrating network, or a mixture of all these molecular forms. Additionally, the polymeric compound may also include additives such as stabilizers, processing aids, or scents. The additives may either be organic, inorganic, or metallic in nature.

Furthermore, several materials may serve the purpose of mediums in which scented material may be carried for the purposes of attracting prey. The scented properties can either reduce the scent in comparison of the metallic materials so that prey are less likely to be wary of the material, or the scented properties can enhance the scent in comparison of the metallic materials so that the prey are attracted to the material.

The fish hook devices may be produced by a variety of methods, including, but not limited to injection molding, solvent casting, compression molding, melt casting, machining, or thermoforming. Additional processes may include various annealing and crosslinking processes and/or surface treatments.

Moreover, as shown in FIGS. 2A–2E, the configuration of the fish hook may encompass a variety of shapes, forms, and sizes. The device may be straight, curved, or reversed and may be of varied size, diameter, or weight. As shown in FIGS. 3A–3E, the shank 11 length and type, the position and type of eye 12, and the position, type, and number of points 10 and barbs 13 are also not important. For example, the eye may be Ringed Eye or Turned Down Eye. The point may be a straight point, rolled point, bent-in point, or a bent-out point. Furthermore, the distance of the gap and bite (6 and 7 in FIG. 1) are also not significant.

This invention has been described by reference to specific examples and embodiments, which will bring alternative embodiments, modifications and variations to the minds of those skilled in the art. The appended claims are intended to encompass all such alternatives, modifications, and variations.

I claim:

1. A fishing apparatus comprising: a fish hook having a steel eye; a shank; a steel point; and at least one steel barb thereon; said eye being connected to said shank, said shank having a bend, said bend being connected to said point and said fish hook being made from a material which is optically clear and scented.

2. A fishing apparatus comprising: a fish hook having a steel turned down eye; a shank; a steel point; and at least one steel barb thereon; said eye being connected to said shank, said shank having a bend, said bend being connected to said point and said fish hook being made from a material which is optically clear and scented.

3. A fishing apparatus comprising: a fish hook having a steel eye; a shank; a steel rolled point; and at least one steel barb thereon; said eye being connected to said shank, said shank having a bend, said bend being connected to said point and said fish hook being made from a material which is optically clear and scented.

4. A fishing apparatus comprising: a fish hook having a steel eye; a shank; an outwardly bent steel point; and at least one steel barb thereon; said eye being connected to said shank, said shank having a bend, said bend being connected to said point and said fish hook being made from a material which is optically clear and scented.

5. A fishing apparatus comprising: a fish hook having a steel eye; a shank; a steel point; and at least one steel barb thereon; said eye being connected to said shank, said shank having a bend, said bend being connected to said point and said fish hook being made from a material which is of a tinted color.

6. An underwater fishing component, comprising: a swivel made from a resilient material which is optically clear.

7. The underwater fishing component of claim 6 wherein said swivel is further scented.

* * * * *